United States Patent [19]

Masson

[11] 4,249,204
[45] Feb. 3, 1981

[54] DEVICE AND METHOD FOR ADJUSTING THE VALUE OF CHROMATISM ABERRATIONS IN AN OPTICAL SYSTEM, NOTABLY FOR TV CAMERAS

[75] Inventor: André Masson, Saint-Heand, France

[73] Assignee: Etablissements Pierre Angenieux, Saint-Heand, France

[21] Appl. No.: 31,866

[22] Filed: Apr. 20, 1979

[30] Foreign Application Priority Data

May 5, 1978 [LU] Luxembourg ............................ 79603

[51] Int. Cl.³ .............................................. H04N 9/04
[52] U.S. Cl. ..................................................... 358/55
[58] Field of Search ................ 358/55, 50; 356/106 R

[56] References Cited
U.S. PATENT DOCUMENTS 4,164,752   8/1979   Doi et al. ................................ 358/55

Primary Examiner—Richard Murray
Attorney, Agent, or Firm—Michael J. Striker

[57] ABSTRACT

These device and method for adjusting the value of the chromatism and distortion aberrations in an optical system, notably for color television cameras, by using a diascope from which a color image is injected into the optical system, comprises an assembly of at least four prismatic blades forming two optically parallel groups of variable thickness, each group comprising two such blades, the blades consisting of transparent materials having the same index of refraction and the same index of dispersion of the blades of the same group, but a different index of dispersion for each group, with control means for varying the thickness of each group while preserving a constant total thickness.

4 Claims, 3 Drawing Figures

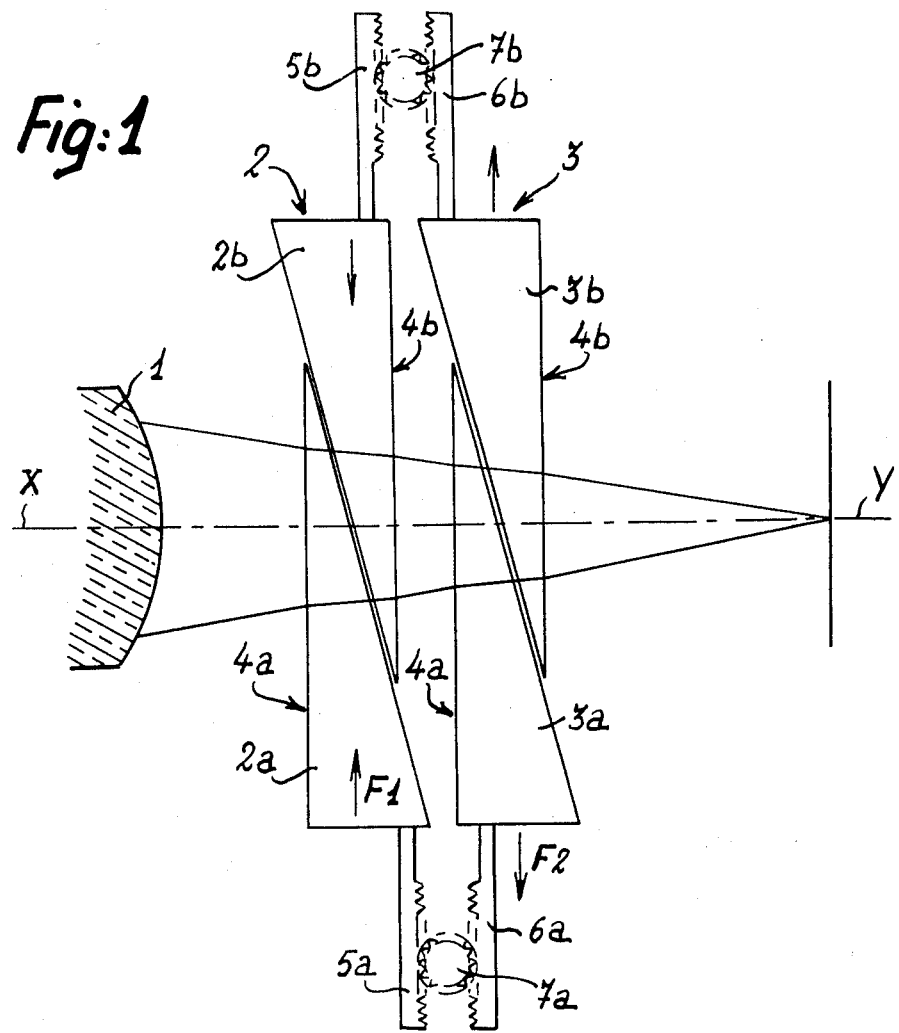
Fig:1
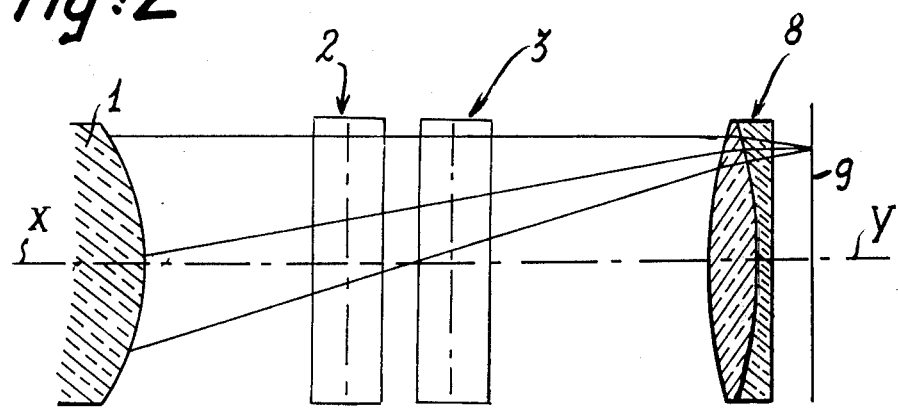
Fig:2

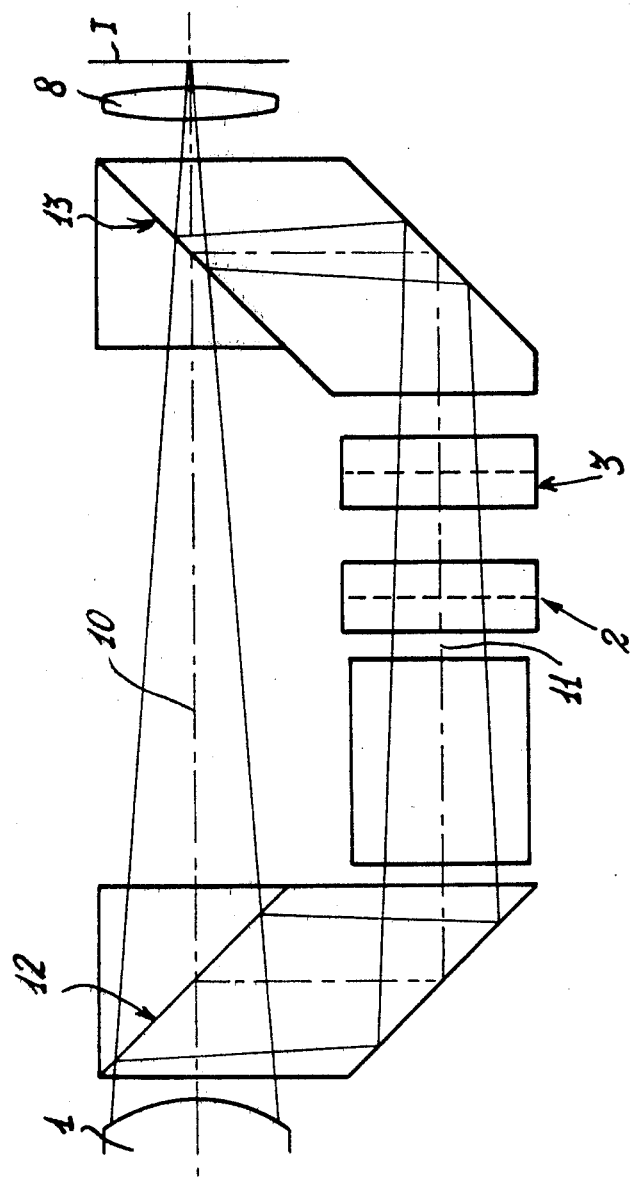

DEVICE AND METHOD FOR ADJUSTING THE VALUE OF CHROMATISM ABERRATIONS IN AN OPTICAL SYSTEM, NOTABLY FOR TV CAMERAS

BACKGROUND OF THE INVENTION

1. FIELD OF THE INVENTION

This invention relates to a device and a method for adjusting to a predetermined value the chromatism aberrations, independently of any other aberrations, notably for the adjustment of color television cameras, by using a diascope.

2. DESCRIPTION OF THE PRIOR ART

At present, it is possible to construct optical combinations having theoretically predetermined residual values of chromatic and distortion aberrations. These chromatism and distortion values are obtained by construction with a certain degree of tolerance. It is one object of this invention to provide adjustment method and means for compensating this tolerance.

On the other hand, in variable-power optical combinations the value of the residual chromatism and distortion aberrations, as well as of their tolerance, are variable. It is another object of this invention to provide means affording a variable adjustment as a function of power so that the residual chromatism aberrations and on the other hand their tolerances can be corrected.

SUMMARY OF THE INVENTION

To this end, the device according to this invention consists of an assembly comprising at least four prismatic blades forming two parallel groups including each two blades and having variable thicknesses, said blades consisting of transparent materials having a same refractive index and a same index of dispersion for each group of prismatic blades, but a different index of dispersion for each group, control means being also provided for varying the thickness of each group while preserving a constant total thickness thereof.

Thus, as will be explained presently, it is possible to adjust the chromatism aberrations by varying the thickness of each group of blades in the device of this invention. Preferably, this device may also comprise, in combination, a system for adjusting likewise the distortion aberrations of the same optical system. This adjustment system may consist in this case of a single or double lens, disposed in the image plane or in close vicinity thereof, and associated with means for causing the movement of translation of the system along the optical axis. Consequently, the distortion of the corresponding optical system can be modified by means of this movement of translation.

This device may be used notably for neutralizing the variations in chromatism and distortion aberrations which occur when varying the focal length in a variable focal-length lens system.

However, as will be explained more in detail presently, the device of this invention may also be used for carrying out a novel method of adjusting a color television camera by injecting an image produced by a diascope.

Other characteristics and advantages of the device of this invention will appear as the following description proceeds with reference to the attached drawing illustrating diagrammatically a preferred form of embodiment of the invention, given by way of illustration, not of limitation.

BRIEF DESCRIPTION OF THE DRAWING

FIG. 1 is a diagrammatic side-elevational and sectional view of the device of this invention, intended for adjusting the chromatism aberrations of an optical system;

FIG. 2 is a similar view showing a modified form of embodiment of the device, and FIG. 3 is a diagrammatic view showing another form of embodiment of the device of this invention.

DESCRIPTION OF THE PREFERRED EMBODIMENT

As already mentioned in the foregoing, the purpose of the device according to this invention is to set the value of the chromatism aberrations of an optical system, for example a taking lens system of which only the last lens 1 is shown in FIG. 1. This device, disposed beyond this optical system, comprises in this example two groups of prismatic blades, each group consisting of a pair of prismatic blades 2a, 2b and 3a, 3b, respectively. Each blade has a triangular cross-section and in a same group the two corresponding blades are juxtaposed with their adjacent inclined faces disposed obliquely in relation to the optical axis XY of the optical system 1. On the other hand, their opposite faces extend at right angles to this axis.

Thus, the two groups of blades are parallel to each other and their input faces 4a are perpendicular to the optical axis XY. The same applies to their output faces 4b.

However, it would not constitute a departure from the basic principles of the invention to use in each group two prismatic blades having different vertex angles, provided that also the indices of refraction have different values, so as to obtain, through the combination of these two prismatic blades, an optically parallel group. In this case, only one of the two opposites faces will be perpendicular to the axis.

The prismatic blades of the two groups are movable in directions at right angles to the optical axis XY and the arrangement is such that the two blades of a same group can be moved toward each other. However, the movements take place in opposite directions for the blades of the two groups, so that the thickness of the two groups can be modified but the total thickness of the assembly remains constant.

Thus, as illustrated in the example of FIG. 1, the two blades 2a and 3a are each rigid with a toothed rack 5a, 6a meshing with a common driving pinion 7a, thus imparting equal and concomittent movements to these two blades, but in opposite directions, as shown by the arrows F1 and F2, respectively. The two blades 2b and 3b are also provided with similar toothed racks 5b and 6b meshing with a common driving pinion 7b, whereby each blade is moved in a direction opposed to that of the blade pertaining to the same group.

Each group of prismatic blades consists of glass having the same refractive index and the same index of dispersion. Yet, on the other hand the index of dispersion differs for each group. Thus, the blades of the first group may be made of flint glass and the blades of the second group 3 of borosilicate glass.

With the arrangement contemplated, the total optical thickness corresponding to the passage through the two groups of blades remains constant for the central wavelength of the light spectrum involved. However, since the optical thickness for each wavelength is dependent upon the index of refraction n of the glass through which the light beam is caused to pass, equivalent paths will be obtained which vary (according to the wavelength) as a function of the thicknesses e1 and e2 of the two groups concerned.

In fact, considering for example wavelengths such as 450 nm 550 nm and 640 nm, we have:

$$\frac{e1}{n1\ (450)} - \frac{e2}{n1\ (650)} > \frac{e2}{n2\ (450)} - \frac{e2}{n2\ (650)}$$

since n1 (450)−n1 (650)>n2 (450)−n2 (650).

In these inequalities, e1 and e2 designate the variable thicknesses of the two groups through which the light beam is caused to pass, and n1 and n2 the indices of refraction of the blades forming these two groups. Under these conditions, if the thicknesses e1 and e2 are modified, the discrepancy between the values of the two above-mentioned inequalities increases and the images produced at wavelengths 450 nm and 650 nm are located at different points.

On the other hand, the image corresponding to the central wavelength of the spectrum remains stationary.

Preferably, the device of this invention is associated with another device capable of causing likewise the variation of distortion aberrations. In this specific form of embodiment, illustrated diagrammatically in FIG. 2, there is also provided, beyond the two groups of prismatic blades disignated by the general reference numerals 2 and 3, a movable optical element designated in general by reference numeral 8 and located in the image plane 9 or in close vicinity thereof. This optical element 8 may consist of a lens 5 or a double lens, as in the example illustrated.

This element 8 exerts a predominant action on the distortion of the image produced on the plane 9. Therefore, it is only necessary to move this element in one or the other direction for modifying the value of this distortion.

FIG. 3 illustrates another form of embodiment of the chromatism aberrations adjustment device of this invention. As in the form of embodiment shown in FIG. 1, this device comprises two groups of movable prismatic blades designates in general by the reference numerals 2 and 3. The two relevant blades of each group consist of glass having a same refractive index and the same dispersion index, but this dispersion index differs for each group. The arrangement is on the other hand the same as in the case shown in FIG. 1, in that the blades of the two groups are movable in opposite directions so that the thickness of each groups be variable, while preserving a constant total thickness. However, in contrast to the case illustrated in FIG. 1, the two groups of prismatic blades 2 and 3 are not disposed in the path of the main beam 10 issuing from the optical system 1. In fact, in the present case, these two groups of blades are disposed in the path of a deflection 11 of this beam. This deflection is obtained by adding a pair of dichroic blades 12 and 13 located in close vicinity of the lens system 1 and in close vicinity of the image plane g, respectively, according to the specific case contemplated, the optical element 8 providing the necessary distortion adjustment. Thus, the central wavelength of the spectrum is transmitted directly along the path 10 of the main beam, while the endmost wavelengths follow the deflection path 11 so that they pass through the two blade groups 2 and 3.

Now, these two paths are obtained by using materials such that the optical paths be equal for the central wavelength. However, by modifying the thicknesses of the two groups of blades 2 and 3, it is possible to vary the optical thicknesses for the three wavelengths of the above-described example, so that these thicknesses may assume any value with respect to each other in order to modify the position of the corresponding images. Moreover, with this arrangement, the image dimensions in the various colors may be adjusted, provided that the beams issuing from the centre of the pupil be inclined in relation to the optical axis, and that the depth-of-field (linked to the numeric aperture of the system) affords a longitudinal shift between the images without impairing their quality.

Due to its inherent advantageous features, the device according to this invention can be used in many applications pertaining to different fields.

One of the advantageous applications of this device consists in utilizing it in variable-focus lens systems for compensating variations in the chromatism and distortion aberrations caused, in this system, by the focus variation. For this purpose, it is possible to use an adjustment device of the type illustrated in FIGS. 1 and 2. However, the chromatism may be corrected in a variable fashion as a function of the focal length, by adding a mechanism coupled to the means controlling the focal length variations.

Given a 10-mm thickness variation, and by using glass materials having widely spaced constringencies, it is possible to correct discrepancies of the order of 100 microns, and a modulation of the differences on either side of the central wavelength of the spectrum may be obtained by using a third blade made from a glass composition having different properties.

However, as already mentioned in the foregoing, another particularly interesting application of the device of this invention lies in the adjustment of view taking cameras for color television. Besides, with the device of this invention it is possible in this specific case to carry out a new adjustment method.

In connection with color television, it may be remembered that it comprises essentially a three-color scanning of the images from the image of a lens system (preferably of the variable focus type), by decomposing same into three images colored by means of dichroic mirrors.

However, the perfect superposition of these three images formed on each one of the three tubes must be checked periodically. One of the methods used for this purpose consists in utilising a real pattern or definition chart and to take a view thereof in order to compare the images obtained through the complete optical chain of the apparatus, which comprises the lens system (preferably of the variable focus type) and the trichrome scanning separating means. However, a known inconvenience of this method is that it is excessively time-robbing and requires breaks in the television emission.

Therefore, it would be more advantageous to have the possibility of injecting a color picture produced by a diascope into the optical chain of the camera. However, up to now it has not been possible to use this picture for making the above-defined adjustment, for it did not take into account the chromatism and distortion aberrations produced by the complete chain of the apparatus.

Now the adjustment device of this invention is so designed that it permits of so to say "pairing" the chromatism and distortion aberrations of the diascope with those of the optical chain of the view taking apparatus.

In this respect, the use of a chromatism and distortion aberrations adjustment device comprising two groups of prismatic blades will not be described by way of example. In this device:

the blades of the first group have a refractive index $nd = 1.69$ and a constringency $d = 31$;

and the blades of the second group have a refractive index $nd = 1.69$ and a constringency $d = 59$.

If e1 (thickness of the first group) increases by $e1 = 10$ mm and e2 (thickness of the second group) decreases by $e2 = 10$ mm, the equivalent path through the air becomes:

$$\text{for} = 436 \text{ nm} \frac{\delta e1}{n1 (436)} = 5.82 \text{ mm} \frac{\delta e2}{n2 (436)} = 5.86 \text{ mm}$$
$$\text{for} = 546 \text{ nm} \frac{\delta e1}{n1 (546)} = 5.90 \text{ mm} \frac{\delta e2}{n2 (546)} = 5.90 \text{ mm}$$
$$\text{for} = 644 \text{ nm} \frac{\delta e1}{n1 (644)} = 5.94 \text{ mm} \frac{\delta e2}{n2 (644)} = 5.91 \text{ mm}$$

or, in other words, that between 644 nm and 436 nm, a difference between the paths thus introduced is $(5.94 - 5.82) - (5.91 - 5.86) = 0.07$ mm.

This value may be increased or reduced according to the thickness $\delta e$ and the difference between the constringencies. On the other hand, given a 4-degree inclination of the main beam in relation to the optical axis, the difference (0.07 mm) introduced by this compensation between red and blue pictures is attended by a dimensional difference of 5 microns.

Thus, the device of this invention permits of adjusting the positions of the red and blue pictures, as well as their dimensions.

If, on the other hand, the group of lenses located near the image has a focal length of the order of 40 mm and the objective lens is located at a distance of about 100 mm from the image, a difference in position of 0.1 mm will cause a geometrical distortion of the order of 0.03% for a 13-mm field, i.e. a dimensional difference of only 4 microns.

In this respect, it is clear that the television camera adjustment method described hereinabove constitutes in itself one of the specific subject matters of the present invention. In fact, this method is definitely original in comparison with hitherto known methods proposed for this specific adjustment. Besides, the method of the present invention is characterized by several important advantages in comparison with prior art methods.

Without further analysis, the foregoing will so fully reveal the gist of the present invention that others can, by applying current knowledge, readily adapt it for the various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new is:

1. A device for adjusting the value of the chromatism aberrations of an optical system, which comprises an assembly consisting of at least four prismatic blades forming two optically parallel groups having a variable thickness and comprising two blades each, said blades being made from transparent materials having the same index of refraction and the same index of dispersion for the blades of a same group, but a different index of dispersion for each group, and control means for varying the thickness of each group of blades while preserving a constant total thickness.

2. A device as claimed in claim 1, wherein said assembly of movable blades forming two parallel groups of variable thickness is disposed on the path of a deflection of the main light beam, said deflection being obtained by means of dichroic blades forming an integral part of the device.

3. The device claimed in claim 2, further including a means and at least one lens, all lenses being located intermediate said assembly and an image plane and being further located in at least close proximity to the image plane along an optical axis of said assembly, and the means moving all lenses along the optical axis, whereby optical distortion can be modified.

4. In a color television camera with an optical system, an improvement for adjusting chromatic aberrations of the optical system, the improvement comprising control means and at least four prismatic blades arranged into at least two groups having a thickness and including exactly two blades each and being optically parallel to each other, the blades being made from transparent materials having equal indices of refraction and having indices of dispersion which vary from group to group while remaining constant within each group, and the control means varying position of the blades with respect to each other in a manner that the thickness of each group is varied while a sum of all thicknesses of all groups remains constant during such variation.

* * * * *